US006982628B1

(12) United States Patent
Hacker et al.

(10) Patent No.: US 6,982,628 B1
(45) Date of Patent: Jan. 3, 2006

(54) MECHANISM FOR ASSIGNING AN ACTUATOR TO A DEVICE

(75) Inventors: Heidrun Hacker, Hemmingen (DE); Stephan Schmitz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 624 days.

(21) Appl. No.: 09/297,952

(22) PCT Filed: Oct. 15, 1997

(86) PCT No.: PCT/DE97/02362

§ 371 (c)(1),
(2), (4) Date: Aug. 30, 1999

(87) PCT Pub. No.: WO98/20463

PCT Pub. Date: May 14, 1998

(30) Foreign Application Priority Data

Nov. 7, 1996 (DE) ........................................ 196 45 769
Sep. 30, 1997 (DE) ........................................ 197 43 101

(51) Int. Cl.
*H04Q 5/22* (2006.01)
*G05B 23/02* (2006.01)

(52) U.S. Cl. ................ 340/10.2; 340/10.4; 340/825.52; 340/3.1

(58) Field of Classification Search ................ 340/10.2, 340/825.49, 525, 870.13, 10.4, 10.1, 3.5, 340/825.52, 3.1; 307/10.1
See application file for complete search history.

(56) References Cited

U.S. PATENT DOCUMENTS

| | | | | |
|---|---|---|---|---|
| 4,495,496 A | | 1/1985 | Miller | |
| 4,837,568 A | | 6/1989 | Snaper | |
| 4,998,249 A | * | 3/1991 | Bennett et al. | 370/458 |
| 5,357,141 A | * | 10/1994 | Nitschke et al. | 307/10.1 |
| 5,450,087 A | | 9/1995 | Hurta et al. | |
| 5,493,283 A | * | 2/1996 | Hopper et al. | 340/10.42 |
| 5,508,689 A | * | 4/1996 | Rado et al. | 340/3.1 |
| 5,515,053 A | * | 5/1996 | Hecht et al. | 340/10.2 |
| 5,636,342 A | * | 6/1997 | Jeffries | 714/48 |
| 5,686,902 A | * | 11/1997 | Reis et al. | 340/10.2 |
| 5,905,442 A | * | 5/1999 | Mosebrook et al. | 340/3.7 |

FOREIGN PATENT DOCUMENTS

| | | |
|---|---|---|
| EP | 285 419 | 10/1988 |
| EP | 427 342 | 5/1991 |
| GB | 2 259 227 | 3/1993 |

* cited by examiner

*Primary Examiner*—Michael Horabik
*Assistant Examiner*—Clara Yang
(74) *Attorney, Agent, or Firm*—Kenyon & Kenyon

(57) ABSTRACT

A mechanism for assigning an actuator to a device. It includes a transmitter on the device side for transmitting a scanning signal as well as a processing unit on the actuator side which include means for receiving scanning signals and which emits a contact signal when a scanning signal matches a previously defined reference signal. The processing system emits the contact signal only at the end of a predetermined time delay, which is characteristic for a specific actuator, after receiving the scanning signal.

14 Claims, 4 Drawing Sheets

MECHANISM FOR ASSIGNING AN ACTUATOR TO A DEVICE

BACKGROUND OF THE INVENTON

FIELD OF THE INVENTION

The present invention relates to a mechanism for assigning an actuator to a device mechanism of this type, in the form of an access control system, is known from European Patent Application No. 285 419. The mechanism described enables an interrogation unit to unambiguously identify an assigned transponder from a group of multiple transponders located at the same time within access range of the interrogation unit through step-by-step interrogation of the transponder codes. The latter are designed in the form of multi-digit binary words. During the first interrogation step, the interrogation unit checks whether the first digit in the binary code word corresponds to the first digit of a reference code word provided in the interrogation unit. The transponders for which this check has a negative result are ignored for the remainder of the check. In a second interrogation step, the interrogation unit checks the remaining transponders to see whether the second digit in their binary code words correspond to the second digit of the reference code word in the interrogation unit. This process is repeated until only one transponder remains whose entire binary code corresponds to the reference code in the interrogation unit. To unambiguously identify one of 2n transponders, at least n such interrogation steps are needed. Selecting a specific transponder from a number of transponders in this manner qualifies the known mechanism for access protection applications, especially for situations in which an adequate amount of time is available for performing the identification process. In practice, however, the assignment of an actuator to a corresponding device must frequently be done as quickly as possible, for example in access systems for locking and unlocking doors.

SUMMARY OF THE INVENTION

The object of the present invention is to provide an assignment mechanism which makes an unambiguous assignment quickly, at the same time guaranteeing adequate security.

This object is achieved by a mechanism with the features of the main claim. According to the present invention enables one or more actuators from a group of actuators to be clearly identified in just one interrogation-response step. To provide security for the assignment made, this step is suitably followed by an exchange of changing, encrypted codes between the participating elements. The mechanism according to the present invention makes it possible to assign multiple authorized actuators to a single device. After being interrogated by a scanning signal emitted by the device, each actuator responds at the end of a period of time that is characteristic for that specific actuator. In a preferred application in doors, the transmission of a scanning signal by the device, for example the door locking mechanism, is suitably triggered when the door handle is pressed. In one advantageous embodiment, the mechanism according to the present invention makes it possible to train the new actuators to the corresponding device. For this, it is useful for one of the actuators to be specially marked, and a training of new actuators is possible only if the specially marked actuator is located within the communication range of the device.

DETAILED DESCRIPTION

Figure 1:
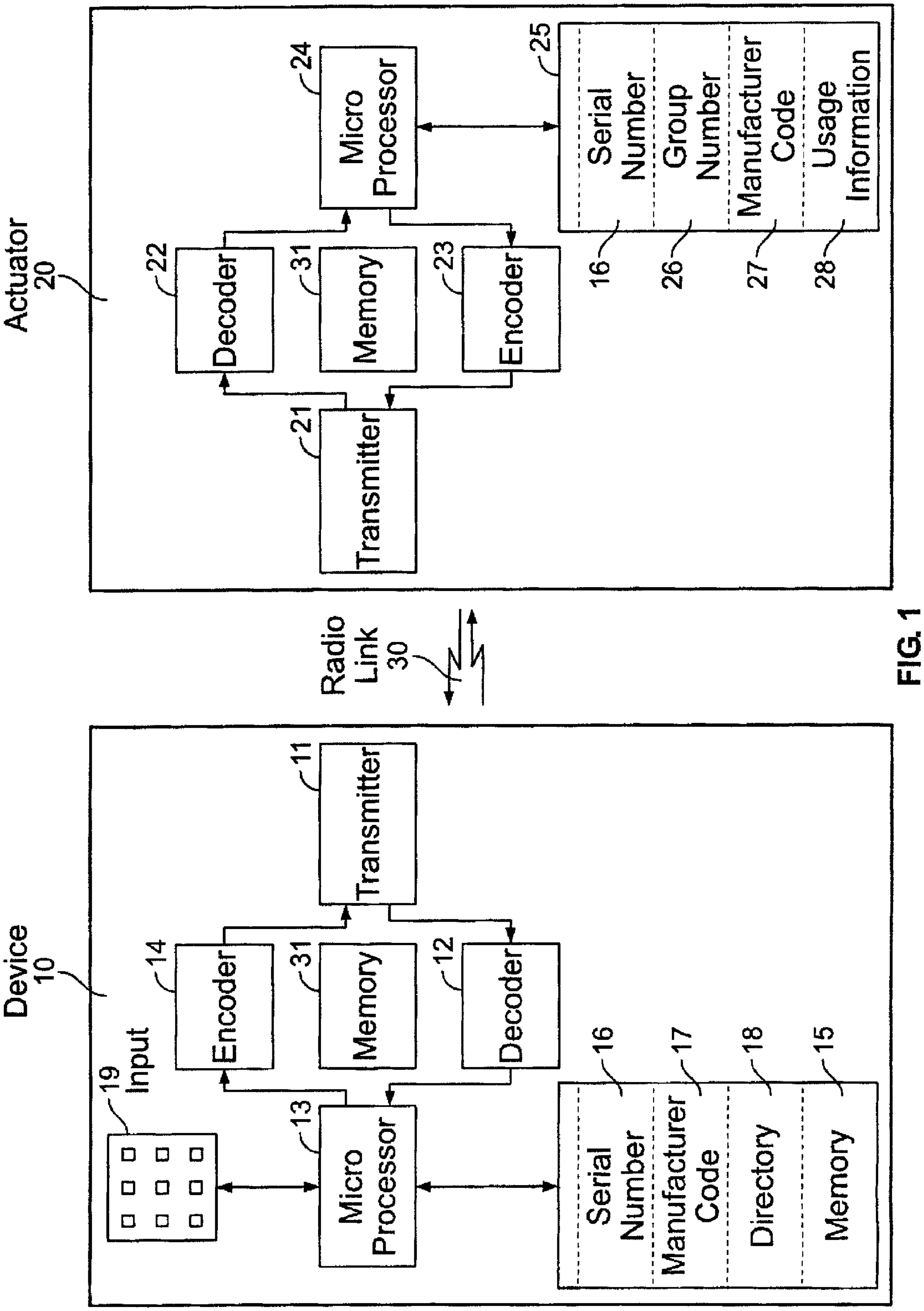
FIG. 1 shows a block diagram of an assignment mechanism.

In FIG. 1, a device 10 may be, e.g., an access control system for a motor vehicle or a building, a computer, or other consumer goods. An actuator 20 may be functionally assigned to device 10. The actuator 20 can be, for example, a transponder. Device 10 contains a transceiver 11 for sending and receiving contactlessly transmittable signals via a radio link 30. Connected to its output is a decoder 12, which receives the encrypted signals received by transceiver 11 for decoding. To encrypt the signals, a memory 31 containing the necessary information, in particular in the form of a cryptic key code, is assigned to decoder 12. The decrypted signals are supplied to a downstream microprocessor 13, which analyzes them and initiates subsequent actions depending on the analysis result. In particular, it controls the transmission of signals via transceiver 11. Microprocessor 13 is also assigned a memory 15, which contains, among other things, a serial number 16, a manufacturer code 17, and a directory 18 containing the group numbers of actuators 20 assigned to device 10. Manufacturer code 17 is assigned by the device manufacturer, unambiguously identifying it. Serial number 16 is characteristic of devices 10 and actuators 20 assigned to each other, while the group numbers are used to distinguish between actuators 20 having the same serial numbers and assigned to a common device 10. Signals to be transmitted via transceiver 11 are usually encrypted. An encoder 14, which is also connected to memory 31, is connected for this purpose between microprocessor 13 and transceiver 11 for encoding the signals. Device 10 also has an input device 19, allowing a user to access microprocessor 13. Input device 19 can be, for example, a keypad, as indicated in FIG. 1; other embodiments are also possible.

Actuator 20 has a transceiver 21 corresponding to the transceiver on the device side for receiving signals transmitted by device 10 or sending contactlessly transmittable signals to device 10. Like in the device, a decoder 22 for encrypting encoded signals is connected downstream from transceiver 21. To decode the signals, the decoder is also connected to a memory 31, whose contents correspond to those of memory 31 on-the device side, and in which, in particular, the cryptic key code used for signal encryption in device 10 is stored. Also connected to decoder 22 is a microprocessor 24, which processes the signals received via transceiver 21 and encoder 22 and initiates subsequent actions depending on the result. Microprocessor 24 controls, in particular, the transmission of signals to device 10 via transceiver 21. Transmission is usually encrypted to prevent monitoring or emulation. For this purpose, an encoder 23, which is also connected to memory 31, is connected between microprocessor 24 and transceiver 21 (just like in the device) in order to carry out the encoding function. Microprocessor 24 is also assigned a storage device 25. It includes, in particular, a storage space 16 for storing a serial number, a storage space 26 for storing a group number, and a storage space 27 for storing a manufacturer code. The latter code is assigned by the manufacturer of actuator 20 and unambiguously identifies the latter. The serial number is a code that is characteristic of the overall mechanism composed of device 10 and actuator 20. It is suitably defined by the manufacturer or possibly by the user of the overall mechanism and is identical to serial number 16 provided in device 10. The group number is used to distinguish between multiple actuators 20 having the same serial number. It is defined by the user when the mechanism is used. Memory 25 also contains usage information 28 for defining the range of functions of corresponding actuator 20. If used in a vehicle, for example, usage information 28 can limit the valid action radius of an actuator 20 to a specific value. In an alternative embodiment, usage information 28 can also be stored in the memory of device 10.

A radio link 30 for sending contactlessly transmittable signals between transceiver 11 on the device side and receiver 21 on the actuator side is located between device 10 and actuator 20. Signals emitted by transceiver 11 on the device side simultaneously reach all actuators 20 located within their range. Infrared signals or high-frequency signals are suitably used as signals.

Figure 2:
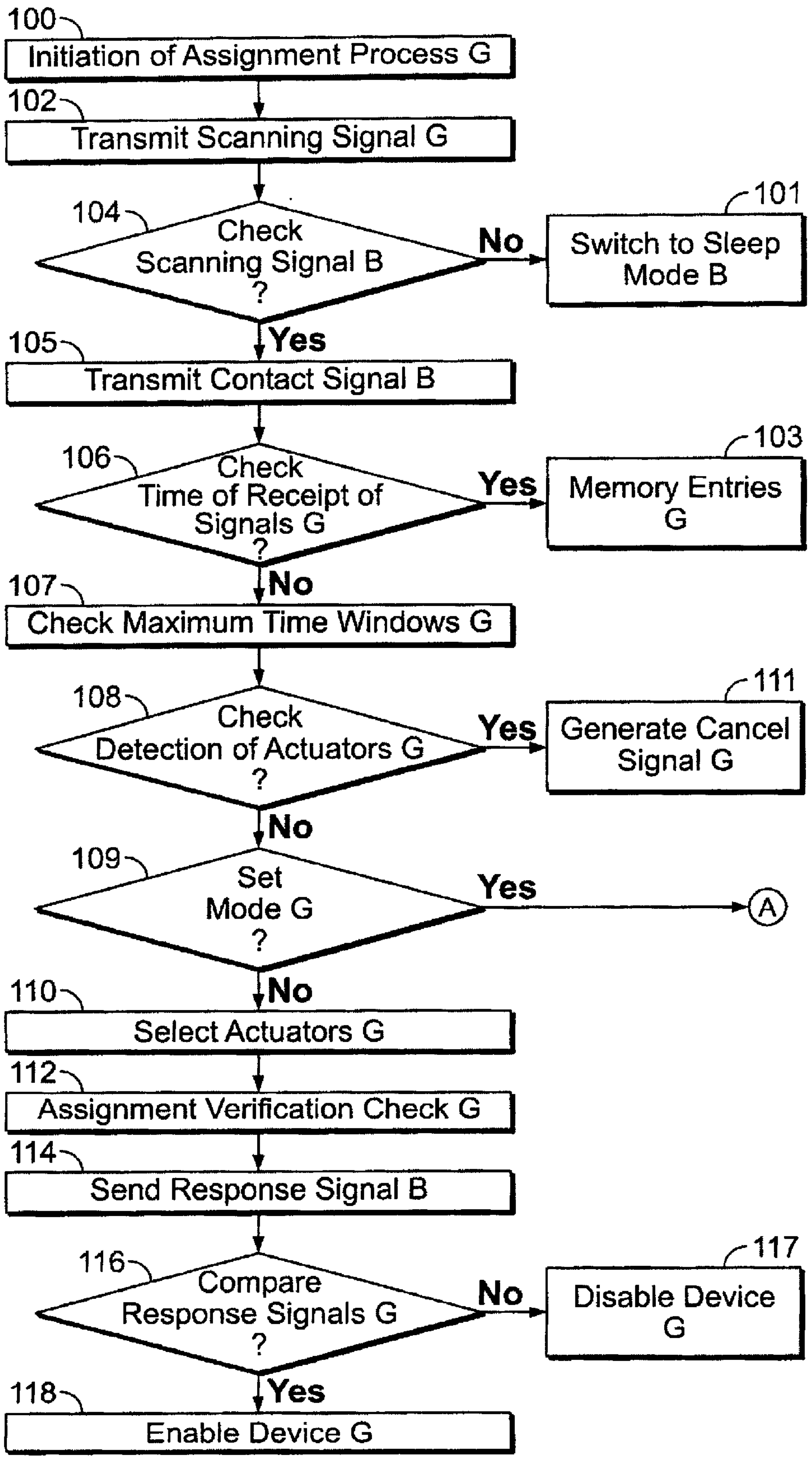
FIG. 2 shows a flowchart illustrating the mechanism's operation.
Figure 5:
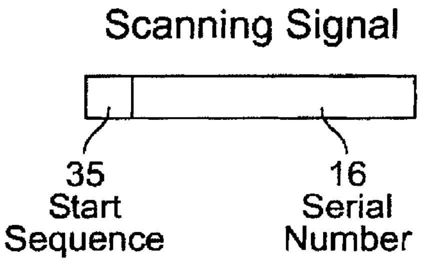
FIG. 5 shows the structure of a scanning signal.

The mode of operation of the mechanism illustrated in FIG. 1 is explained below on the basis of the flowchart in FIG. 2. Letters G and B provided in each process step show whether that step takes place in device 10(G) or in actuator 20(B). The assignment process is usually initiated by a user operating a mechanical, electrical, or electro-optical trigger mechanism (not shown), which is labeled Step 100. If used in conjunction with the door of a motor vehicle, the trigger mechanism can involve, for example, pressing the door handle. Based on the subsequently transmitted signal, microprocessor 13 in device 10 transmits a scanning signal via transceiver 11 (Step 102). As indicated in FIG. 5, the scanning signal essentially includes a start sequence 35, preferably in the form of a start bit, as well as serial number 16 stored in memory 15. The signal is suitably not encrypted. The scanning signal transmitted by device 10 is received by transceivers 21 of all actuators 20 located within the range of radio link 30. After the signal is transferred by decoder 22, it is checked by microprocessors 24 of all actuators 20 to see if the serial number transmitted with the scanning signal corresponds to serial number 16 stored in memory 25 and serving as the reference signal (Step 104). Start bit 25, which is also transmitted, is used to synchronize microprocessor 24 to the received scanning signal. If the check performed in actuator 20 during step 104 reveals that reference serial number 16 located in memory 25 does not match the serial number transmitted with the scanning signal, actuator 20 switches to a sleep mode (Step 101). It no longer participates in subsequent communication with device 10.

If the check performed in Step 104 reveals that the received serial number corresponds to stored serial number 16, microprocessor 24 prepares a response in the form of a contact signal. The contact signal is a short, simple signal, for example group number 26 of corresponding actuator 20 in bit-encoded form. Like the scanning signal, it is not encrypted. Processor 24 transmits it at the end of a period of time after receiving the scanning signal that is characteristic for actuator 20. The contact signal is then transmitted in a time window of a predetermined length (Step 105). The length of the time window is set so that the contact signal can be reliably assigned by both actuator 20 and the device.

Figure 3:
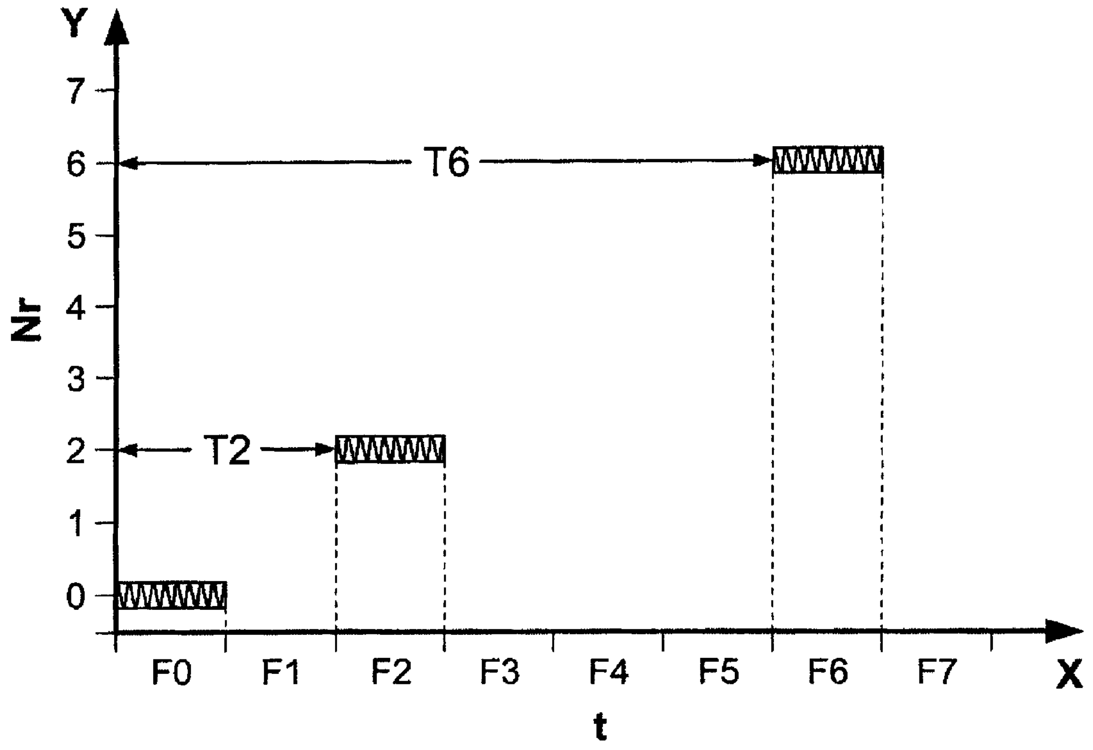
FIG. 3 shows the relationship between the entry time of a contact signal and an actuator.

FIG. 3 shows a graphical representation of the function of actuator 20 following the check performed in step 104. In this illustration, the abscissa represents a time axis t, which is divided, for example, into eight time windows F0 to F7 and begins upon receipt of the scanning signal by the actuators. The ordinate shows characteristic group number 26 of corresponding actuator 20. In the example of FIG. 3, eight actuators 20 with group numbers 0 through 7 are assigned to device 10. Let us assume that, of this number, actuators 20 having group numbers 2 and 6 lie within the active range of a scanning signal when the scanning signal is transmitted by device 10. Both actuators 2 and 6 present respond to the scanning signal by transmitting a contact signal according to Step 106. In the underlying example, the time of contact signal transmission, i.e., the ordinal number of the selected time window, corresponds to the group number of the corresponding actuator. Actuator 2 therefore transmits its contact signal at the end of time delay T1 (i.e., time windows F0 and F1) in time window F2, while actuator number 6 transmits its signal at the end of time delay T6 (i.e., time windows F0 to F5) in time window F6. Receiver 11 of device 10 subsequently receives two offset contact signals, which appear in windows F2 and F6 and directly indicate which actuators 20 are located within the range of radio link 30.

Microprocessor 13 now detects actuators 20 that are present by checking time windows F0 to F7 in which contact signals were received (Step 106). By repeating this process m times, it checks the maximum number (m) of time windows to which actuators can be assigned (Step 107). Actuators 20 present are noted by making entries in memory 15 (Step 103). If no actuators (20) are detected, a cancel signal is generated (Steps 108, 111). Once actuators 20 present have been detected, the mode is set (Step 109); the possible modes are assign and teach, as well as additional functions such as delete, block, enable, and the like. For this purpose, microprocessor 13 checks whether a command exists for selecting teach mode. If so, it continues by executing step 200 as explained below. If this command does not exist, microprocessor 13 reaches a decision as to which of existing actuators 20 should participate in the rest of the assignment communication process (Step 110). This decision can be reached, for example, by ranking actuators 20, with somewhat different ranges of functions being assigned to actuators 20. For applications in motor vehicles, for example, specific actuators 20 can be assigned a limited geographical area within which the vehicle can be operated with the actuator. Microprocessor 13 identifies the actuator selected from among actuators 20 present by transmitting its group number. All other actuators 20 present that have different group numbers no longer participate in the remainder of the communication process.

Device 10 then subjects selected actuator 20 to an assignment verification check. In the example, this is done using the known challenge-response method. Via its transceiver 11, device 10 transmits an encrypted challenge signal which is destined for selected actuator 20 and is executed only by the latter (Step 112). At the same time, microprocessor 13 on the device side detects an expected response signal. This signal is calculated from the challenge signal according to a predetermined algorithm, using the cryptic key stored in memory 31 and manufacturer code 17 provided in memory 15. This ensures the uniqueness of the response signal and thus the ability to distinguish between actuators within the group. Meanwhile, the challenge signal is received by transceiver 21 in actuator 20, decoded in decoder 22 with the help of cryptic key 31, and supplied to microprocessor 24. The latter derives a response signal from the received challenge signal in the same manner as microprocessor 13 on the device side and sends it back to device 10 (Step 114). There the signal is received by transceiver 1, decoded in decoder 12, and supplied to microprocessor 13. The latter compares it to the previously generated expected response signal (Step 116). If the two signals do not match, device 10 and actuator 20 do not belong to each other. Processor 13 then initiates a suitable follow-up action, for example it disables device 10 so that it cannot be used (Step 117). In addition, it can be useful to alert the user that an assignment was not made, for example using optical or acoustic indicators.

Further follow-up actions can also be provided, for example repetition of the assignment process, starting with Step 112 or Step 102. If, as the result of the check and Step 116, the response signal returned by actuator 20 does match the previously generated expected response signal, a confirmation that the assignment is correct is issued. It can be useful for this to take place in a form that can be perceived visually or acoustically by the user, and to cause device 10 to be enabled, for example (Step 118).

Figure 4:
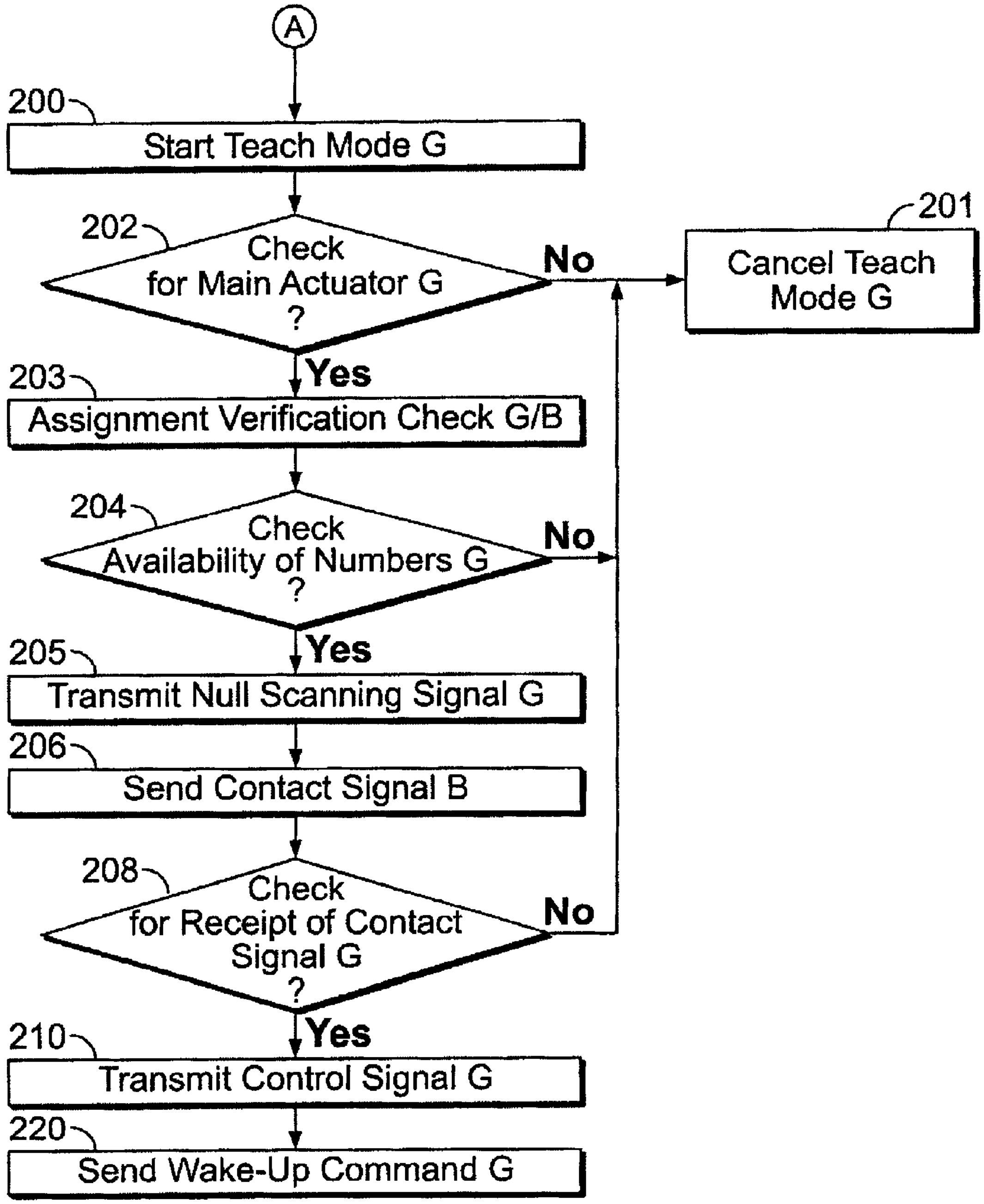
FIG. 4 shows a flowchart illustrating the operation of the assignment mechanism when it is taught to sense new actuators.

Mechanism 10, 20, 30 described above permits, through training, new, in particular factory-new actuators 20 to also be assigned to an existing device 10. This type of new assignment is carried out as illustrated by the flowchart in FIG. 4. The suffix added to each process step in the form of the letters B or G again reveals whether that process step takes place in device 10(G) or in actuator 20(B). The training of actuators 20 to be newly assigned initially takes place in the same manner as the assignment, illustrated in FIG. 2, of units already known to each other and begins by triggering an assignment communication process according to Step 100. Actuators 20 located within the active range of device 10 are then detected according to Steps 102 to 108. In Step 109, however, teach mode is defined (Step 200). Switching between the assign and teach modes is suitably accomplished by the user with the aid of input device 17. Microprocessor 13 then checks (Step 202) whether a specific actuator 20, considered the main actuator, is present. The main actuator can be, for example, the actuator with group number 0 which returns a contact signal in first time window F0 after receiving the scanning signal. If microprocessor 13 determines that main actuator 20 is not present, it cancels the teach mode.

If the check in Step 202 reveals that the main actuator is present, it is subjected to an assignment verification check (Step 203) according to Steps 102 to 118. If the incorrect assignment was made, the teach mode is canceled (Step 201). If a correct assignment between the main actuator and the device is determined, microprocessor 13 checks, on the basis of directory 18, whether there are any more available group numbers not yet assigned to an actuator and whether any further actuators 20 can be assigned to device 10 (Step 204). If not, it cancels the teach mode again (Step 201). If the answer is yes, microprocessor 13 transmits a null scanning signal (Step 205). The structure of the null scanning signal is identical to that of a scanning signal that is emitted during normal operation in Step 104 and is also not encrypted. The serial number, however, is replaced by a new serial number characteristic of brand-new actuators 20. If binary serial numbers are used, they are composed, for example, of a simple sequence of zeros. Any brand-new actuators 20 located within the active range of radio link 30 receive the null scanning signal. Each of their microprocessors 24 then randomly selects a time window in which it sends a contact signal back to device 10 (Step 206). To do this, it links, for example, manufacturer code 27 provided in memory 25 to a random number generated by microprocessor 24. Meanwhile, device 10 checks for receipt of contact signals following the transmission of the null scanning signal (Step 208). If microprocessor 13 determines that no contact signal was received, it cancels the teach mode (Step 201). However, if microprocessor 13 determines that a contact signal produced by a null scanning signal was received in a time window, it transmits a control signal (Step 210), which immediately switches any other existing actuators 20 to idle mode, including those which send a contact signal in a later time window. Microprocessor 13 then repeats Steps 205 to 210 with detected actuators 20 a specific number of times, i.e., k times, where k is an integer, in order to ensure that only one actuator 20 participates in the new assignment communication process even if multiple new actuators 20 to be assigned have responded in the same time window. When only one active actuator 20 to be taught remains within the range of radio link 30, microprocessor 13 transmits serial number 16, cryptic key code 31, and a characteristic group number 26 to be assigned later on to actuator 20. Actuator 20 transfers transmitted code information 16, 26, 31 to the spaces provided for them in memory 25, which are still free at this point. After code information 16, 26, 31 has been successfully transmitted and stored, actuator 20 sends an acknowledgment signal to device 10. This can be, for example, manufacturer number 27. It is stored by microprocessor 13 on the device side and causes a disable command to be sent to actuator 20. This command causes serial number 16 previously read to memory 26 and the cryptic code information stored in memory 31 to be read- and write-protected. Actuator 20 is then assigned to device 10. In subsequent Step 220, device 10 then sends a wake-up command, which is used to reactivate any additional actuators 20 that were placed in sleep mode. Device 10 can then be taught to respond to additional new actuators 20 to be assigned by repeating steps 202 and following.

The mechanism described above can be designed and modified in many different ways, at the same time retaining the basic idea of identifying actuators on the basis of the time at which they respond to a scanning signal. This applies, for example, to the structure of the device and actuators, to the layout and sequence of process steps, and possibly to the implementation of the access verification check or the form and structure of the code information exchanged via the radio link.

What is claimed is:

1. A system comprising:

a device including a transmitter which transmits a scanning signal; and at least one actuator assigned to the device, the at least one actuator including a processing unit, the processing unit having an arrangement which receives the scanning signal, wherein, if the scanning signal matches a predetermined reference signal, the processing unit transmits a contact signal to the device, the contact signal being transmitted after a predetermined time delay period, from a receipt of the scanning signal, expires, and wherein the device assigns a further predetermined time delay period to an unassigned actuator in order to train the unassigned actuator, the further predetermined time delay period characterizing the unassigned actuator.

2. The system according to claim 1, wherein the predetermined time delay period characterizes the at least one actuator.

3. The system according to claim 1, wherein the contact signal is transmitted within a predetermined response time period.

4. The system according to claim 1, wherein the device includes an analyzing arrangement which detects the at least one actuator as a function of a time period when the contact signal is received.

5. The system according to claim 1, wherein the at least one actuator includes a plurality of actuators, and wherein, after the plurality of actuators are detected, the device selects a particular actuator of the plurality of actuators, the device subjecting the particular actuator to an assignment verification check procedure.

6. The system according to claim 1, wherein the at least one actuator includes at least one of a mechanical actuator, an electric actuator and an electro-optical actuator, one of the mechanical actuator, the electric actuator and the electro-optical actuator being assigned to the device, an actuation of one of the mechanical actuator, the electric actuator and the electro-optical actuator triggering a transmission of the scanning signal.

7. The system according to claim 1, wherein the device assigns the further predetermined time delay period to the unassigned actuator only if the at least one actuator is located within an active range of the scanning signal.

8. A method for assigning at least one actuator to a device, comprising the steps of:

transmitting a scanning signal using a transmitter which is situated in the device;

receiving the scanning signal using an arrangement of a processing unit, the processing unit being situated in the at least one actuator;

if the scanning signal matches a predetermined reference signal, transmitting a contact signal to the device using the processing unit, the contact signal being transmitted after a predetermined time delay period, from a receipt of the scanning signal, expires; and assigning a further predetermined time delay period to an unassigned actuator by the device in order to train the unassigned actuator, the further predetermined time delay period characterizing the unassigned actuator.

9. The method according to claim 8, wherein the predetermined time delay period characterizes the at least one actuator.

10. The method according to claim 8, further comprising the step of:

transmitting the contact signal within a predetermined response time period.

11. The method according to claim 8, further comprising the step of:

detecting the at least one actuator as a function of a time period when the contact signal is received by an analyzing arrangement of the device.

12. The method according to claim 9, further comprising the steps of:

detecting a plurality of actuators;

after the detecting step, selecting a particular actuator of the plurality of actuators using the device; and subjecting the particular actuator, using the device, to an assignment verification check procedure.

13. The method according to claim 10, wherein the at least one actuator includes at least one of a mechanical actuator, an electric actuator and an electro-optical actuator, the method further comprising the steps of:

triggering a transmission of the scanning signal as a function of an actuation of one of the mechanical actuator, the electric actuator and the electro-optical actuator; and assigning one of the mechanical actuator, the electric actuator and the electro-optical actuator to the device.

14. The method according to claim 9, wherein the assigning step is performed only if the at least one actuator is located within an active range of the scanning signal.

* * * * *

UNITED STATES PATENT AND TRADEMARK OFFICE
CERTIFICATE OF CORRECTION

PATENT NO. : 6,982,628 B1
APPLICATION NO. : 09/297952
DATED : January 3, 2006
INVENTOR(S) : Hacker et al.

It is certified that error appears in the above-identified patent and that said Letters Patent is hereby corrected as shown below:

Column 1, line 4, remove “BACKGROUND OF THE INVENTION”

Column 1, line 8, change “to a device” to --to a device.--

Column 1, line 8, remove “mechanism of this type, in the”

Column 1, line 9, insert the heading --BACKGROUND OF THE INVENTION--

Column 1, line 9, insert text following heading --A mechanism of this type, in the--

Column 1, line 39, change “The object of” to --An object of--

Column 1, lines 43-44, remove “This object… the main claim.”

Column 1, line 44, change “According to” to --The mechanism according to--

Column 8, line 14, change “according to claim 9,” to --according to claim 8,--

Signed and Sealed this

Second Day of January, 2007

JON W. DUDAS
*Director of the United States Patent and Trademark Office*